United States Patent [19]
Skotheim et al.

[11] Patent Number: 5,690,702
[45] Date of Patent: Nov. 25, 1997

[54] METHOD OF MAKING ELECTROACTIVE HIGH STORAGE CAPACITY POLYCARBON-SULFIDE MATERIALS AND ELECTROLYTIC CELLS CONTAINING SAME

[75] Inventors: Terje A. Skotheim; Igor P. Kovalev, both of Tucson, Ariz.

[73] Assignee: Moltech Corporation, Tucson, Ariz.

[21] Appl. No.: 729,713

[22] Filed: Oct. 7, 1996

Related U.S. Application Data

[62] Division of Ser. No. 478,330, Jun. 7, 1995, Pat. No. 5,601,947.

[51] Int. Cl.$^6$ .................................................. H01M 6/00
[52] U.S. Cl. ........................ 29/623.1; 429/213; 29/623.5
[58] Field of Search .................................. 29/623.1, 623.5; 429/213, 215, 217; 525/354, 364, 367, 343; 528/381, 386, 387, 388

[56] References Cited

U.S. PATENT DOCUMENTS

| | | | |
|---|---|---|---|
| 4,742,127 | 5/1988 | Armand et al. | 525/354 |
| 5,441,831 | 8/1995 | Okamoto et al. | 429/213 |
| 5,460,905 | 10/1995 | Skotheim et al. | 429/213 |
| 5,462,566 | 10/1995 | Skotheim et al. | 29/623.1 |
| 5,601,947 | 2/1997 | Skotheim et al. | 429/213 |

*Primary Examiner*—M. Nuzzolillo

[57] ABSTRACT

The present invention relates to novel electroactive energy storing polycarbon sulfide (PCS) materials of general formula $(CS_x)_n$ wherein x is greater than 2.3 to about 50, and n is greater than 2. This invention also relates to novel rechargeable electrochemical cells containing positive electrode materials comprised of said polycarbon-sulfide materials with improved storage capacity at ambient and sub-ambient temperatures. This invention also relates to novel gel type solid electrolytes useful in high energy storage batteries.

18 Claims, No Drawings

METHOD OF MAKING ELECTROACTIVE HIGH STORAGE CAPACITY POLYCARBON-SULFIDE MATERIALS AND ELECTROLYTIC CELLS CONTAINING SAME

RELATED APPLICATION

This application is a divisional of U.S. patent application Ser. No. 08/478,330, filed Jun. 7, 1995, now U.S. Pat. No. 5,601,947.

BACKGROUND OF THE INVENTION

This invention relates to novel electroactive energy storing polycarbon-sulfide (PCS) materials of general formula $(CS_x)_n$ wherein x is greater than 2.3 to about 50, and n is equal to or greater than 2. This invention also relates to novel rechargeable electrochemical cells containing positive electrode materials comprised of said polycarbon-sulfide materials with improved storage capacity and cycle life at ambient and sub-ambient temperatures. This invention also relates to novel gel electrolytes developed for high energy density rechargeable non-aqueous batteries.

Batteries are used in almost all portable consumer electronic products from flash lights to lap top computers. Over the years, considerable interest has been shown in developing lighter weight high energy-density rechargeable batteries for many applications including electric vehicles. In this regard, thin film solid state batteries using the polycarbon-sulfide cathode materials of this invention are particularly well suited for use in many consumer applications because of their high energy to weight ratio.

Two main types of cathode materials used in the manufacture of thin film lithium and sodium batteries are known in the art. The first materials include transition metal chalcogenides, such as titanium disulfide with alkali metals as the anode. For example, among the cathode active chalcogenides, U.S. Pat. No. 4,049,879 lists transition metal phosphorous chalcogenides. Other U.S. patents, such as U.S. Pat. Nos. 4,143,214, 4,152,491 and 4,664,991 describe cells wherein the cathode is a carbon/sulfur based material, generally of the $C_xS$ formula where x is typically 10 or larger.

U.S. Pat. No. 4,143,294 to Chang, et al., describes cells having cathodes containing $C_xS$ wherein x is a numerical value from about 4 to about 50. U.S. Pat. No. 4,152,491 to Chang et at., relates to electric current producing cells where the cathode-active materials include one or more polymer compounds having a plurality of carbon monosulfide units. The carbon monosulfide unit is generally described as $(CS)_x$, wherein x is an integer of at least 5, and may be at least 50, and is preferably at least 100. In both cells developed by Chang, et al. the energy storage capacity is limited because there is a low density of sulfur-sulfur bonds.

U.S. Pat. No. 4,664,991 to Perichaud, et al., describes a substance containing a one-dimensional electric conducting polymer and at least one polysulfurated chain forming a charge-transfer complex with the polymer. Perichaud, et al., use a material which has two components. One is the conducting polymer, which is selected from a group consisting of polyacetylenes, polyparaphenylenes, polythiophenes, polypyrroles, polyanilines and their substituted derivatives. The other is a polysulfurated chain which is in a charge transfer relation to the conducting polymer. The polysulfurated chain is formed by high temperature heating of sulfur with the conjugated polymer. As a result of using this material, the cell of perichaud, et al. exhibits a fairly low voltage of only 2.0 V against lithium.

U.S. Pat. Nos. 4,833,048 and 4,917,974 to De Jonghe, et at., describe a class of cathode materials made of organo-sulfur compounds of the formula $(R(S)_y)_n$ where y=1 to 6; n=2 to 20, and R is one or more different aliphatic or aromatic organic moieties having one to twenty carbon atoms. One or more oxygen, sulfur, nitrogen or fluorine atoms associated with the chain can also be included when R is an aliphatic chain. The aliphatic chain may be linear or branched, saturated or unsaturated. The aliphatic chain or the aromatic rings may have substituent groups. The preferred form of the cathode material is a simple dimer or $(RS)_2$. When the organic moiety R is a straight or a branched aliphatic chain, such moieties as alkyl, alkenyl, alkynyl, alkoxyalkyl, alkythioalkyl, or aminoalkyl groups and their fluorine derivatives may be included. When the organic moiety comprises an aromatic group, the group may comprise an aryl, arylalkyl or alkylaryl group, including fluorine substituted derivatives, and the ring may also contain one or more nitrogen, sulfur, or oxygen heteroatoms as well.

In the cell developed by De Jonghe, et al., the main cathode reaction during discharge of the battery is the breaking and reforming of disulfide bonds. The breaking of a disulfide bond is associated with the formation of an $RS^-M^+$ ionic complex. The organo-sulfur materials investigated by De Jonghe, et al., undergo polymerization (dimerization) and de-polymerization (disulfide cleavage) upon the formation and breaking of the disulfide bonds. The de-polymerization which occurs during the discharging of the cell results in lower weight monomeric species which can dissolve into the electrolyte layer, thereby severely reducing the utility of the organo-sulfur material as cathode-active material. The result is an unsatisfactory cycle life having a maximum of about 200 deep discharge-charge cycles, more typically less than 100 cycles as described in *J. Electrochem. Soc.*, Vol. 138, pp. 1891–1895 (1991). In particular, the organo-sulfur materials developed by De Jonghe, et.al., are highly unstable in the presence of high conductivity liquid, plasticized, or gel electrolytes.

A significant additional drawback with the organo-sulfur materials developed by De Jonghe, et al., is the slow kinetics of oxidation and reduction at ambient temperatures, severely reducing the power output of cells incorporating cathodes made with these organo-sulfur materials. The slow kinetics result from the oxidation and reduction being related to the formation and breaking, respectively, of disulfide bonds on non-conjugated, non-conductive materials. Such breaking and reforming of said disulfide bonds results in depolymerization and repolymerization, respectively, wherein such process are kinetically very slow.

U.S. patent application Ser. No. 145,091 (now U.S. Pat. No. 5,441,831) describes polycarbon disulfide materials of general formula $-(CS_x)_n-$, wherein x ranges from 1.7 to 2.3 and n is greater than 2. These compositions are prepared by the reduction of carbon disulfide with alkali metal using relatively short reaction times that produce polymers with structures comprised of

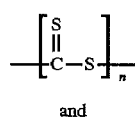

and

-continued

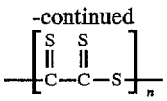

Such materials suffer from a limited sulfur content and thus, limited capacity relative to the materials of the present invention. Materials described in U.S. patent application Ser. No. 145,091 (now U.S. Pat. No. 5,441,831) have sulfur content less than 86 wt %.

Despite the various approaches proposed for organosulfur cathode materials, there remains a need for inexpensive cathode materials having high storage capacity, high discharge rates and very long cycle lives at ambient and sub-ambient temperatures.

It is, therefore, a primary object of this invention to provide new polycarbon-sulfur based cathode materials for thin film solid state batteries which are inexpensive, yet avoid the limitations existing in the prior art, while offering performance characteristics much higher than those of known materials.

It is another object of this invention to provide new cathode materials having as the active material polycarbonsulfide (PCS) polymers which need not undergo polymerization and de-polymerization upon oxidation and reduction.

It is yet another object of this invention to provide a method of making a solid state rechargeable battery including the novel cathode of the invention.

SUMMARY OF THE PRESENT INVENTION

It is an object of the present invention to provide a novel electroactive energy storing polycarbon-sulfide (PCS) material useful as a solid state cathode material in rechargeable batteries. In its fully charged or oxidized state, the PCS material can be represented by the formula I,

   I wherein x ranges from greater than 2.3 to about 50, and n is equal to or greater than 2 and said PCS material does not contain aliphatic or aromatic moieties. Said PCS material is further characterized by the incorporation of large fractions of polysulfur components, which on electrochemical reduction in an electrolytic cell, provides the exceptionally high storage capacity per unit weight of material. In contrast to materials presently known in the art, the PCS materials of the present invention undergo oxidation and reduction with the formation and breaking, respectively, of many sulfur-sulfur bonds which are attached to conjugated structures that provide good electron transport and fast electrochemical kinetics at ambient temperatures and below. Said PCS materials when used as cathode materials in battery cells, may be optionally mixed with conductive components and binders to further improve electrochemical recycleability and capacity of said cathode active material.

One embodiment of this invention relates to PCS compositions of formula I prepared by the reduction of carbon disulfide with alkali metals, such as sodium or lithium, in an appropriate solvent such as dimethyl sulfoxide, dimethyl formamide (DMF), N-methyl pyrrolidinone, hexamethyl phosphoramide, and the like, incorporating long reaction times before workup. It has been surprisingly discovered that reaction times greater than about 41 hrs provide PC S materials of the present invention with elemental compositions containing between about 86 wt % and 98 wt % sulfur. Preferred PCS compositions are those that have elemental compositions containing between about 90 wt % and 98 wt % sulfur.

Although the detailed structure of such PCS materials has not been completely determined, available structural information suggests that these compositions of general formula I of the present invention are comprised of one or more of the structural units of formulas II–V;

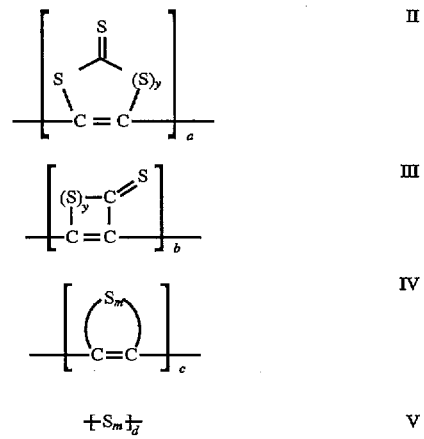

wherein m is the same or different at each occurrence and is greater than 2, y is the same or different at each occurrence and is equal to or greater than 1, and the relative amounts of a, b, c, d, e, f, and g comprising said PCS material can vary widely and depend on the method of synthesis. Preferred PCS compositions with high electrochemical capacity are those containing substantial amounts of species —(S$_m$)— are incorporated in and —(S$_m$)— and —(S$_y$)— incorporated in and attached to the polymer backbone. Especially preferred compositions are those wherein m is on the average equal to or greater than 6, and y is on the average equal to or greater than 1. A key feature of these compositions is that electrochemical reduction and oxidation need not lead to depolymerization and repolymerization of the polymeric backbone. Further, the polymer backbone structure contains conjugated segments which may facilitate electron transport during electrochemical oxidation and reduction of the polysulfur side groups, wherein electrochemical reduction and oxidation of the conjugated backbone segments does not occur.

It is another object of this invention to provide a rechargeable, solid state electric current producing cell capable of operating at ambient temperatures and below, which is comprised of:

(a) an anode which is comprised of one or more alkali or alkaline earth metals;

(b) a novel cathode having as the cathode active material one or more polycarbon-sulfur compounds which can be formulated as $(CS_x)_n$ wherein x is from greater than 2.3 to about 50, and n is greater than or equal to 2; and (c) an electrolyte which is chemically inert with respect to the anode and the cathode and which permits the transportation of ions between the anode and the cathode.

The anode material may be an elemental alkali metal or an alkali-metal alloy including the mixture of an elemental alkali metal and one or more alloys made from an element selected from the Periodic Table Group IA and IIA metals. Lithium and sodium are useful materials for the anode of the battery of the invention. The anode may also be alkali-metal intercalated carbon such as $LiC_x$ where x is equal to 6 or greater. Also useful as anode materials of the present invention are alkali-metal intercalated conductive polymers, such as lithium, sodium or potassium doped polyacetylene, polyphenylene, and the like.

The cathode employed in the battery of the invention as the cathode active material is comprised of a PCS material of the formula $(CS_x)_n$, wherein x is from greater than 2.3 to about 50, and n is a numerical value greater than or equal to 2, and preferably greater than 10.

The electrolytes used in battery cells function as a medium for storage and transport ions, and in the special case of solid electrolytes these materials additionally function as separator materials between the anodes and cathodes. In principle, any liquid, solid, or solid-like material capable of storing and transporting ions may be used. Particularly preferred are solid electrolyte separators comprised of polyethers, polyimides, polyphosphazenes, polyacrylonitriles (PAN), polysiloxanes, polyether grafted polysiloxanes, blends of the foregoing, derivatives of the foregoing, copolymers of the foregoing, crosslinked and network structures of the foregoing, and the like to which is added an appropriate electrolyte salt.

New types of electrolytes have been discovered in the practice of the present invention that are generally useful in non-aqueous high energy density batteries. These electrolytes are "gel-type" solid electrolytes that consist of a high molecular weight polymer matrix into which is dissolved an electrolyte salt, then subsequently swollen with a low molecular weight liquid which effectively acts as a plasticizer for the salt-polymer matrix. These low molecular weight liquids are referred to as gelation agents and are generally common organic solvents or liquid oligomers. Any organic liquid capable of swelling said salt-polymer matrix can be used as a gelation agent so long as it is stable to the selected cathode and anode in the battery cell. A substantial increase in electrolyte conductivity can be achieved by introducing these gelation agents into said salt-polymer blends. Gel-polymer electrolytes of this type have been found to be especially useful in lithium and sodium (anode) based high energy density batteries.

A variety of solid gel-type electrolytes have been found to be useful in the practice of this invention. Illustrative of useful gel-type electrolytes are polyacrylonitriles, sulfonated polyimides, cured divinyl polyethylene glycols, cured polyethylene glycol-bis-(methyl acrylates), and cured polyethylene glycol-bis-(methyl methacrylates) which have been swollen with propylene carbonate (PC), ethylene carbonate (EC), glymes, low molecular weight polysiloxanes, and mixtures thereof. Especially useful solid and gel-type electrolytes are those comprising polyethylene glycol-bis-(methyl methacrylates) which have been cured (crosslinked) using UV, x-ray, gamma ray, electron beam, or other ionizing radiation.

It is another object of this invention to provide a method of making the solid state batteries incorporating the novel cathode materials of the present invention. The method of making the cells of the present invention is particularly preferred for use in applications requiring high energy storage capacity.

It is still another object of this invention to provide solid state batteries having higher specific energy and higher current than has been previously achieved with organo-sulfur cathode materials.

It is a further object of this invention to provide batteries having long shelf life and a low rate of self discharge.

These and other objects of this invention will be apparent from the following description.

DETAILED DESCRIPTION OF THE INVENTION

There is a fundamental difference between PCS materials of the present invention and organo-sulfur materials disclosed in the art whose electrochemical activity is based on breaking and reforming of disulfide bonds. In the case of PCS materials the oxidation and reduction peaks are closely aligned on the voltage axis indicative of fast, reversible electrochemical kinetics. In the case of $((C_2H_5)_2NCSS)_2$, which is representative of the materials disclosed by De Jonge, et al., containing disulfide bonds, and which polymerizes (dimerizes) and de-polymerizes (cleaves) by the forming and breaking of said disulfide bonds, respectively, during electrochemical oxidation and reduction, there is a spread of about 2 volts between the oxidation and the reduction peaks. This is indicative of very slow electrochemical kinetics associated with bond breaking and formation.

It is clear from these experimental results that PCS behaves like a conjugated polymeric material which is fundamentally different in its structure and electrochemical function compared with the materials developed by De Jonghe, et at., This fundamental difference structurally and electronically is the cause for the substantially higher capacity and much improved electrochemical kinetics at room temperature.

Novel rechargeable battery cells of the present invention comprise three essential components. One essential component is an anode material. The anode may comprise any metal capable of functioning as a negative electrode in combination with the cathode materials of the present invention. Illustrative of useful anode materials of this invention are one or more metals selected from the group consisting of metals belonging to Group IA and Group IIA in the Periodic Table of the elements, such as lithium, sodium, potassium, magnesium, calcium, and the like. Also useful in the practice of this invention are anodes comprised of alloys, mixtures, composites, intercalated carbons, intercalated conductive polymers, and the like, of the aforementioned alkali and alkaline earth metals. Illustrative of such compositions are sodium-lithium alloys, lead-sodium alloys, lithium-tin alloys, lithium-silicon alloys, lithium intercalated carbons, lithium doped polyacetylene, sodium doped polyphenylene, and lithium intercalated graphite. Preferred anodes in the practice of this invention are those comprised of alkali metals. More preferred are those comprised of lithium and/or sodium. Most preferred are anodes comprised of lithium foils of thickness from about 2 microns to about 250 microns.

Another essential component in the novel battery cells of the present invention is a cathode material comprised of a polycarbon-sulfide material of general formula I;

  I wherein x can range from greater than 2.3 to about 50, and n is equal to or greater than 2. Preferred cathode materials are those wherein x is greater than 3, and n is equal to or greater than 5. Particularly preferred cathode materials are those wherein x is equal to or greater than 6, and n is greater than 5.

Also illustrative of useful cathode materials of the present invention are composite cathodes comprised of:
 (a) PCS materials of formula I,
 (b) a non-aqueous electrolyte, and
 (c) a conductive filler.

Useful non-aqueous electrolytes in said composite cathodes can be the same or different from those used in the construction of complete battery cells. A complete description of useful electrolytes in the composite cathodes of the present invention is presented below.

Useful conductive fillers are any conductive materials that can enhance the electrical connectivity between the current collectors and the electroactive cathode components in the cell. It is desirable that said conductive fillers be inert to the components of the cell under the intended operating conditions of the cell. Particularly preferred conductive fillers are conductive carbons; conductive acetylene blacks; graphites; metal powders, flakes and fibers; and electrically conductive polymers such as polyanilines, polyacetylenes, polypyrroles, polythiophenes, polyphenylenes, polyphenylene-vinylenes, polythienylene-vinylenes, and derivatives thereof. Additionally, composite cathodes useful in this invention may contain other polymeric or non-polymeric binder materials that facilitate the formation, fabrication, and assembly of battery cells in desired configurations. Such optional materials are known to those skilled in the art of cathode fabrication and include materials such as polytetrafluoroethylene and other fluorinated polymers, SBR rubbers, EPDM rubbers, and the like.

The third essential component of the battery cells of the present invention is an electrolyte. Illustrative of useful electrolytes in the practice of this invention are electrolytes that are chemically and electrochemically inert with respect to the anode and cathode materials and which permit the migration of ions between the anode and cathode at desired use temperatures. Preferred electrolytes are those that allow for transport of ions at ambient temperatures and below. Particularly preferred are those capable of operating between about −40° C. and +120° C.

Electrolyte systems which have application to both lithium and sodium based rechargeable batteries can be employed in the fabrication of the cell of the invention, such as solid polymer electrolytes, single-ion conducting polymer electrolytes, high conductivity gel polymer electrolytes, and liquid organic electrolytes. Particularly useful electrolytes for use in cells of the present invention are single ion conducting polymer electrolytes with highly delocalized anionic moieties covalently attached to the polymer backbone to achieve high specific lithium ion conductivity, as described in U.S. Pat. No. 4,882,243. The advantages of polymer electrolytes with exclusive cation conduction are reduced cell polarization deriving from low anion mobility, reduced volume changes in the cathode from intercalation of ion clusters, and reduced salt-induced corrosion on the current collectors. Room temperature conductivities for single ion conducting polymer electrolytes described in U.S. Pat. No. 4,882,243 are in the range of $10^{-4}$ to $10^{-5}$ S(Siemens)/cm.

A variety of gel-polymer electrolytes have been discovered to be generally useful in non-aqueous high energy density batteries. Illustrative of useful polymer matrices for gel polymer electrolytes in high energy density batteries are those derived from polyethylene oxides, polypropylene oxides, polyacrylonitriles, polysiloxanes, polyimides, polyethers, sulfonated polyimides, Nafion™, divinyl polyethylene glycols, polyethylene glycol-bis(methyl acrylates), polyethylene glycol-bis(methyl methacrylates), blends of the foregoing, derivatives of the foregoing, copolymers of the foregoing, crosslinked and network structures of the foregoing, and the like. Useful ionic electrolyte salts for gel-polymer electrolytes include $MClO_4$, $MAsF_6$, $MSO_3CF_3$, $MSO_3CH_3$, $MBF_4$, $MB(Ph)_4$, $MPF_6$, $MC(SO_2CF_3)_3$, $MN(SO_2CF_3)_2$,

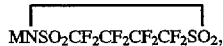

-continued

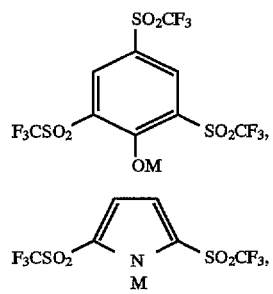

and the like, where M is Li or Na. Other electrolytes useful in the practice of this invention are disclosed in U.S. patent application Ser. No. 192,008 (now U.S. Pat. No. 5,538,812).

Useful gelation agents for gel-polymer electrolytes include ethylene carbonate (EC), polypropylene carbonate (PC), N-methyl acetamide, acetonitrile, sulfolane, 1,2-dimethoxyethane, polyethylene glycols, 1,3-dioxolanes, glymes, siloxanes, and ethylene oxide grafted siloxanes. Particularly preferred gelation agents are those derived from graft copolymers of ethylene oxide and oligomers of poly (dimethyl siloxane) of general formula VI,

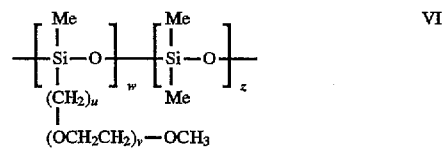

wherein u is an integer equal to or greater than 1, v is an integer equal to or greater than 0 and less than about 30, and the ratio z/w is equal to or greater than 0.

Values for u, v, w, and z can vary widely and depend on the desired properties for said liquid gelation agent. Preferred gelation agents of this type are those wherein u ranges from about 1 to 5, v ranges from about 1 to 20, and the ratio z/w is equal to or greater than 0.5. An especially preferred composition of formula VI is that in which u is equal to 3, v is equal to 7, and the ratio of z to w is 1.

These liquid gelation agents themselves are useful solvents to form liquid electrolytes which provide other effective electrolyte systems for the cells of the invention. For example, glymes with lithium salts, such as $LiAsF_6$, are useful liquid electrolytes. Likewise, compositions of formula VI together with $LiSO_3CF_3$ are especially useful as liquid electrolytes.

Battery cells comprising PCS cathodes can be made in a variety of sizes and configurations which are known to those skilled in the art. Illustrative of useful battery design configurations are planar, prismatic, jelly-roll, W-fold, and the like. These configurations are not to be construed as limitations on the scope of this invention as other designs are anticipated.

In batteries of the present invention, the main design concerns are the kinetics, and the chemical and electrochemical reversibility of the reduction/oxidation reactions, the density of available sulfur atoms, and the miscibility of oxidation and reduction products with the polymer electrolyte. During the discharge of the cells of this invention, the PCS polymer is reduced accompanied by the insertion of $Li^+$ ions into the cathode from the electrolyte to maintain charge neutrality. In contrast to the materials disclosed in U.S. Pat.

Nos. 4,833,048 and 4,917,974, the polycarbon-sulfide materials of the present invention undergo oxidation and reduction with the formation and breaking of multiple sulfur-sulfur bonds attached to conjugated structures which provide good electron transport and fast electrochemical kinetics at ambient temperatures and below. An advantage of using PCS as the cathode active material is the high density of sulfur atoms which results in a high charge storage density during oxidation-reduction. This is accompanied by a high density of $Li^+$ ions inserted for charge neutrality, resulting in a high capacity. In all PCS compounds used for the cathode of the present invention, the sulfur concentration if always greater than 86 wt %.

In contrast to the organo-sulfur materials developed by De Jonghe, et al., PCS need not undergo polymerization/depolymerization upon charge and discharge, thereby maintaining the integrity of the polymer backbone and improving cathode utilization during repeated charge and discharge.

Table 1 summarizes the superior performance of battery cells comprised of PCS anodes of formula I relative to state-of-the-art rechargeable battery systems presently commercialized or under development. The PCS based cells exhibit a volumetric energy density advantage of from 2 to 3 times, and a gravimetric energy density advantage of from 1.7 to 3.5 times better than presently known rechargeable cells in a AA configuration

TABLE 1

Performance comparisons of PCS based rechargeable cells relative to other advanced rechargeable systems in AA cell configurations

| Electrochemical System | Volumetric Energy Density (Whr/L) | Gravimetric Energy Density (Whr/Kg) |
| --- | --- | --- |
| Li/PCS cells of formula I | 430–500 | 175–260 |
| Lithium Ion | 215 | 100 |
| Nickel Metal Hydride | 180–200 | 60–75 |
| Nickel Cadmium (premium) | 120–150 | 40–50 |

The following specific examples are presented to more particularly illustrate the invention, and should not be construed as limitations on the scope and spirit of the invention.

EXAMPLES

Preparation of Polycarbon-sulfide From Carbon Disulfide

Example 1

To 26.2 g of sodium metal in 274 mL of boiling carbon disulfide with stirring was added dropwise 400 mL of dimethylformamide (DMSO) during 5 hours, and the reaction mixture was refluxed for an additional 68 hr. Unreacted carbon disulfide was distilled out and to the remaining solution was added 400 mL of water and 105 mL of concentrated hydrochloric acid. The polymer layer was decanted and washed with water (3×550 mL), then acetone (3×300 mL), and vacuum dried for 2 hours at 180°–195 ° C. The yield of dry polymer was 92.4 g with a softening temperature of 68°–80° C. Elemental analysis gave % C: 11.0, % S:89.0, which corresponds to an empirical formula of —$(CS_{3.0})_n$—.

Example 2

The procedure of example 1 was repeated using 331 g (260 mL) of carbon disulfide, 25 g of sodium metal, 400 mL of dimethyl sulfoxide, and a reflux time of 133 hrs. The yield of polymer was 139 g with an elemental analysis of 7.9% carbon and 92.1% sulfur corresponding to an empirical formula of —$(CS_{4.37})_n$—.

Example 3

For comparative purposes, the procedures of examples 1 and 2 were repeated using reaction time less than 42 hours with the following results:

| Carbon disulfide (g) | Sodium (g) | Solvent (mL) | Reflux time (hrs) | Yield (g) | Elemental composition | Empirical formula |
| --- | --- | --- | --- | --- | --- | --- |
| 436 | 35 | DMSO (450) | 39 | 92 | 83.9 | $CS_{1.95}$ |
| 159 | 12 | DMSO (200) | 41 | 52 | 85.0 | $CS_{2.12}$ |

Preparation of Polycarbon-Sulfide Composite Cathodes

Example 4

A mixture of 40% by weight PCS prepared by the general procedure of Example 1, 50% polyacrylonitrile and 10% acetylene black was suspended in dimethylsulfoxide to form a slurry. The slurry was ground into fine particles and was then cast as a film 25–100 µm thick on a 25 µm thick nickel foil. The entire unit was dried in a vacuum oven at 40° C.–80° C. for 24 hours.

Example 5

A mixture of 40% by weight PCS from example 2, 45% by weight electrolyte and 15% acetylene black was suspended in dimethylsulfoxide to form a slurry. The electrolyte was a gel electrolyte made from polyethylene oxide, propylene carbonate, ethylene carbonate, and $LiSO_3CF_3$. The slurry was finally ground and then cast as a film onto a nickel foil. The entire unit was then dried in a vacuum oven at 40° C.–80° C. for 24 hours.

Preparation of Rechargeable Batteries

Example 6

A rechargeable lithium battery of unipolar sandwich design was prepared by sandwiching a polymer electrolyte of about 25 microns thickness between a lithium foil of 125 micron thickness and the composite cathode (Example 4) of about 25–75 microns thick. To obtain laboratory prototype cells, the above components were sandwiched between two stainless steel circular disks having 0.5 cm thickness. A typical material used for the anode was lithium metal. The PCS of the invention prepared in accordance with the procedure of Examples 1 or 2 was used for the cathode. The electrolyte employed in preparing the battery of this example was a branched polysiloxane containing grafted ethylene oxide side chains (formula VI, u=3, v=7, z/w.=1, molecular weight of 1000) and a $LiSO_3CF_3$ salt.

Example 7

Following the general procedure of Example 6, a rechargeable lithium/polymer electrolyte/PCS battery was prepared, using the composite cathode of Example 4, a lithium foil anode, 9.8 mg of polymer gel electrolyte and 2.3 mg of ultrafine graphite powder. The composite anode contained 7.1 mg of PCS. The polymer gel electrolyte contained polyacrylonitrile, ethylene carbonate, propylene carbonate and LiClO$_4$ with a conductivity of $3 \times 10^{-3}$ S/cm at 25° C.

At 0.10 mA/cm$^2$ current density, a practical capacity of 4.4 mAh has been achieved with a cut-off voltage at 1.5 volts. This translates into 87% of practical cathode utilization at a storage energy of 8.8 mWhr.

Example 8

Another rechargeable lithium cell was prepared having a composite cathode containing 5.4 mg of polymer gel electrolyte, 12.0 mg of PCS of Example 1 and 1.9 mg of graphite powder. Assuming a mid cell potential of 2.5 V, a storage energy of 12.6 mWhr was obtained.

The performance characteristics of the cells prepared in examples 7 and 8 demonstrate that by using the cathode of the invention a very high cathode utilization is readily achieved resulting in energy capacity storage much higher than those achieve by commercially available batteries.

Example 9

A rechargeable lithium battery was prepared having a lithium foil anode of 125 micron thickness, a polyethylene oxide (PEO)/LiSO$_3$CF$_3$ solid electrolyte along with a siloxane (from Example 6)/LiSO$_3$CF$_3$ liquid electrolyte, a composite cathode containing 50 wt % PCS from Example 1 along with 30 wt % conductive carbon and 20 wt % of the PEO/LiSO$_3$CF$_3$ electrolyte, wherein the anode and cathode were separated with Celgard™ 2500. This 1 cm×1 cm planar battery exhibited 103 cycles at a charge/discharge current of 0.05 mA/cm$^2$ with a capacity of 729 mAhr/g for the first several cycles, which then decayed to a final capacity of 243 mAhr/g at cycle 103.

Example 10

A rechargeable lithium battery was prepared having a lithium foil anode of 125 micron thickness, a composite cathode containing 50 wt % PCS from Example 2 along with 30 wt % conductive carbon and 20 wt % of PEO/LiSO$_3$CF$_3$ electrolyte, a solid freestanding film electrolyte of polyethylene glycol-his(methyl methacrylate)/siloxane/LiSO$_3$CF$_3$ which was UV cured (crosslinked), and to the cell was added a small amount of liquid electrolyte containing siloxane (from Example 6)/LiSO$_3$CF$_3$. This 1 cm×1 cm planar battery was charged and discharged at a current density of 0.05 mA/cm$^2$ and exhibited a capacity of 1324 mAhr/g for the first several cycles, which then decayed to a final capacity of 296 mAhr/g at cycle 56.

Example 11

A composite cathode was prepared from a physical mixture of 48 wt % PCS material from Example 1, 12 wt % of polyaniline powder in the form of Versicon™ manufactured by Allied-Signal, Inc., 20 wt % acetylene black, and 20 wt % polymer electrolyte. The polymer electrolyte used to form the composite cathode consisted of a mixture of poly (ethylene oxide) and a branched polysiloxane with ethylene oxide side chains (polysiloxane-graft-(ethylene oxide)$_7$) and LiClO$_4$ in the ratio of 24 ethylene oxide units per lithium. The polymer electrolytes were dissolved in acetonitrile and added to the mixture of PCS, polyaniline and acetylene black to form a viscous slurry. Composite cathodes of thickness approximately 100 microns were cast onto Ni foil substrates and the solvent evaporated. Cells were assembled containing composite cathodes, branched polysiloxane electrolytes and lithium foil anodes. The open circuit potentials of the cells were about 3.23 V.

While the invention has been described in detail and with reference to specific embodiments thereof, it will be apparent to one skilled in the art that various changes and modifications can be made without departing from the spirit and scope thereof.

What is claimed is:

1. A method of forming a composite cathode which comprises:

coating an electrically conducting cathode substrate with a mixture comprising an amount of an electrochemically active polycarbon-sulfide material effective to provide cathode activity, wherein said polycarbon-sulfide material in its oxidized state is of the general formula I

wherein x ranges from greater than 2.5 to about 50, and n is greater than or equal to 2.

2. A method of forming a composite cathode which comprises:

coating an electrically conducting cathode substrate with a mixture comprising an amount of an electrochemically active polycarbon-sulfide material, which in its oxidized state, comprises one or more of the polysulfur species of the formulae II–V

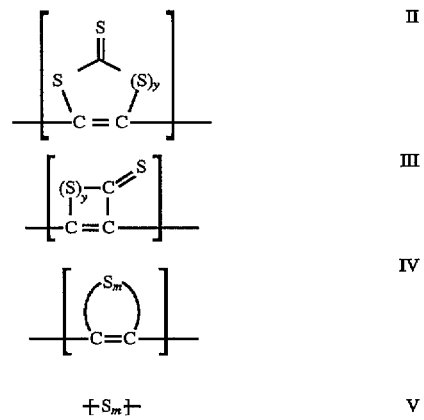

where m is the same or different at each occurrence and is greater than 2, and y is the same or different at each occurrence and is equal to or greater than 1.

3. The method of claim 2, wherein m is the same or different at each occurrence and is equal to or greater than 6.

4. The method of claim 2, wherein the polymer backbone chain of said polycarbon-sulfide material comprises conjugated segments.

5. The method of claim 2 or 3, wherein said polycarbon-sulfide material comprises the polysulfur species of formula V.

6. The method of claim 5, wherein said polysulfur species of formula V is attached by one or both of its terminal sulfur atoms as a side group to the polymer backbone chain of said polycarbon-sulfide material.

7. The method of claim 5, wherein said polysulfur species of formula V is incorporated by attachment of its terminal sulfur atoms into the polymer backbone chain of said polycarbon-sulfide material.

8. The method of claim 5, wherein the polymer backbone chain of said polycarbon-sulfide material comprises conjugated segments.

9. The method of claim 2, wherein said polysulfur species of formula II, III, or IV is incorporated by attachment of its double-bonded carbon atoms into the polymer backbone chain of said polycarbon-sulfide material.

10. The method of claim 9, wherein the polymer backbone chain of said polycarbon-sulfide material comprises conjugated segments.

11. The method of claim 1 or 2, wherein said polycarbon-sulfide material upon electrochemical reduction and oxidation does not undergo depolymerization and repolymerization of the polymer backbone chain of said polycarbon-sulfide material.

12. A method of forming an electric current producing cell comprising:

(a) providing an anode comprised of a metal selected from the group consisting of metals belonging to group IA and group IIA of the Periodic Table of the elements;

(b) providing a composite cathode comprised of a polycarbon-sulfide material, which in its oxidized state, is of the general formula I

  I wherein x ranges from greater than 2.5 to about 50, and n is greater than or equal to 2; and (c) enclosing an electrolyte between said anode and said cathode.

13. A method of forming an electric current producing cell comprising:

(a) providing an anode comprised of a metal selected from the group consisting of metals belonging to group IA and group IIA of the Periodic Table of the elements;

(b) providing a composite cathode comprised of a polycarbon-sulfide material, which in its oxidized state, comprises one or more polysulfur species of formula II-V

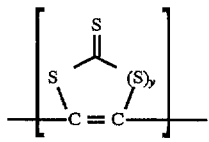 II

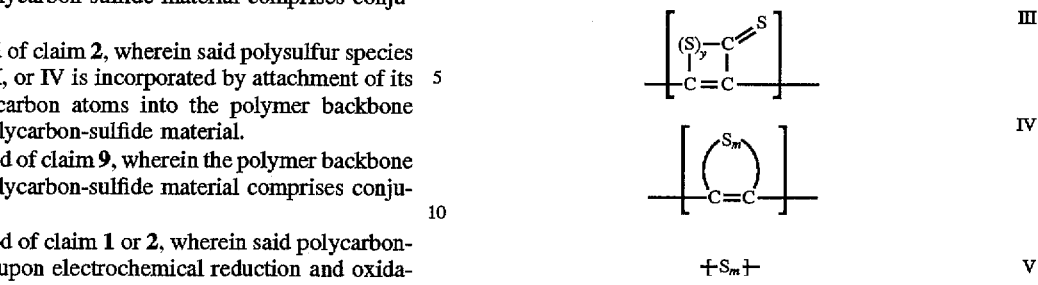

where m is the same or different at each occurrence and is greater than 2, and y is the same or different at each occurrence and is equal to or greater than 1; and (c) enclosing an electrolyte between said anode and said cathode.

14. The method of claim 13, wherein m is the same or different at each occurrence and is equal to or greater than 6.

15. The method of claim 12 or 13, wherein said polycarbon-sulfide material upon electrochemical reduction and oxidation does not undergo depolymerization and repolymerization of the polymer backbone chain of said polycarbon-sulfide material.

16. The method of claim 12 or 13, wherein said anode material is comprised of one or more materials selected from the group consisting of lithium-aluminum alloys, lithium intercalated carbons, sodium intercalated carbons, sodium-lead alloys, lithium-lead alloys, lithium-tin alloys, lithium-silicon alloys, lithium doped polyacetylenes, sodium doped polyacetylenes, and lithium doped polyphenylenes.

17. The method of claim 12 or 13, wherein said cathode further comprises one or more of the materials selected from the group consisting of non-aqueous electrolytes, conductive fillers, and inert binders.

18. The method of claim 12 or 13, wherein said electrolyte comprises one or more materials selected from the group consisting of solid polymer electrolytes, single-ion-conducting polymer electrolytes, gel polymer electrolytes, and liquid electrolytes.

* * * * *